US006925610B2

(12) United States Patent  
Thurston et al.

(10) Patent No.: US 6,925,610 B2  
(45) Date of Patent: Aug. 2, 2005

(54) RECOMMENDATION-BASED ELECTRONIC PROGRAM GUIDE WITH MULTIPLE MODES OF OPERATION

(75) Inventors: Nathaniel J. Thurston, Somerville, MA (US); Thomas L. Renger, Cambridge, MA (US); Charles S. Packer, Cambridge, MA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 124 days.

(21) Appl. No.: 10/270,024

(22) Filed: Oct. 11, 2002

(65) Prior Publication Data

US 2003/0110492 A1 Jun. 12, 2003

Related U.S. Application Data

(60) Provisional application No. 60/338,398, filed on Dec. 7, 2001.

(51) Int. Cl.[7] .............................. G06F 3/00; G06F 3/14; H04N 7/14
(52) U.S. Cl. ...................... 715/811; 715/719; 715/745; 715/747; 715/39; 715/46; 715/61
(58) Field of Search ................................. 715/719–721, 715/744, 745, 747, 765, 780, 781, 810–812, 825, 854; 725/38, 39, 44, 46, 47, 61; 345/719–721, 744, 745, 747, 765, 780, 781, 810–812, 825, 854

(56) References Cited

U.S. PATENT DOCUMENTS

| | | | |
|---|---|---|---|
| 5,678,012 A | 10/1997 | Kimmich et al. | 725/37 |
| 5,745,710 A | 4/1998 | Clanton, III et al. | 725/60 |
| 5,848,396 A * | 12/1998 | Gerace | 705/10 |
| 5,973,683 A | 10/1999 | Cragun et al. | 345/719 |
| 6,081,263 A | 6/2000 | LeGall et al. | 345/760 |
| 6,236,395 B1 | 5/2001 | Sezan et al. | 345/723 |
| 6,263,501 B1 | 7/2001 | Schein et al. | 725/39 |
| 6,397,387 B1 | 5/2002 | Rosin et al. | 725/44 |
| 6,481,010 B2 | 11/2002 | Nishikawa et al. | 725/44 |
| 2003/0084448 A1 * | 5/2003 | Soundararajan | 725/46 |
| 2003/0101449 A1 * | 5/2003 | Bentolila et al. | 725/10 |

* cited by examiner

*Primary Examiner*—X. L. Bautista  
(74) *Attorney, Agent, or Firm*—Moser, Patterson & Sheridan, LLP

(57) ABSTRACT

A novel electronic program guide (EPG) and its associated method allows a viewer/user to navigate through a multitude of programs and locate a program or programs of interest using three contemporaneously available, distinct modes of operation which depend on the degree to which the viewer/user is decided regarding programs to view or reproduce.

20 Claims, 4 Drawing Sheets

RECOMMENDATION-BASED ELECTRONIC PROGRAM GUIDE WITH MULTIPLE MODES OF OPERATION

BACKGROUND OF THE INVENTION

1. Priority Claim

The present application claims priority to co-pending Provisional Application Ser. No. 60/338,398 entitled "Modal and Recommendation Based Electronic Program Guide and Method for Selecting Television Programming", filed on Dec. 7, 2001, and having a common inventive entity.

2. Field of the Invention

The present invention generally relates to electronic program guides used to allow a viewer to select from a multitude of available programs.

3. Background

Electronic Program Guides (EPGs) are specialized graphical user interfaces (GUIs) that allow users to navigate through a multiple of programs available for viewing or reproduction. Many EPGs present one or more layered displays—often available on a dedicated television channel—to give a user an inventory of programs available for viewing or reproduction, as well as schedules and other details (e.g., channels, program length, program synopsis, etc.) about the programs. Pointing devices are often used to control and navigate within the displays, as well as to activate links to the programs of interest. EPGs are especially useful for television viewers who receive a great deal of television stations, as is increasingly the case with cable and satellite television services.

One common complaint of prior art EPGs is that they are not very helpful to viewers/users who are not sure about which program to view. While the displays may be attractively arranged, the user must still often sift through a great deal of information, making the process of locating a desirable program time-consuming, boring and intimidating for the "technologically challenged."

Improvements in the prior art include presenting the viewer/user with a list of default program choices to reduce complexity and display screen clutter. This approach is often rudimentary, and not thorough enough to give a viewer/user enough meaningful choices that might actually be of interest. Other approaches allow a viewer/user who is sure about which program to view or reproduce to enter the identity of the program interest and link to the program.

The aforementioned approaches are either not as comprehensive as desirable, or they are not very effective for the range of viewers/users who may have widely differing degrees of decisiveness regarding the programs that they would like to view or reproduce.

What is therefore desirable, but non-existent, is an EPG and method which allow comprehensive navigation, but are equally effective for viewers/users who do not have any initial idea of which program to view, as well as those who know exactly which program to view, and gradations in between.

SUMMARY OF THE INVENTION

In view of the aforementioned problems and deficiencies of the prior art, the present invention provides, via a graphical user interface, a method for allowing a user to navigate through and select programming of interest. The method at least includes the steps of providing multiple programs for viewing or reproduction, generating an interactive graphical user interface, and displaying via a common display, selected programs and a program guide when desired. The method further at least includes the steps of, in response to user input, locating programs of interest in at least three distinct viewing modes corresponding to the level of the user's decisiveness regarding desirable programs to view or reproduce, all viewing modes being accessible via the common display.

The present invention also provides a graphical user interface for allowing a user to navigate through and select programming of interest. The graphical user interface at least includes a multiple program source adapted to provide multiple programs for viewing or reproduction, a graphical user interface display generator adapted to generate a display, and a graphical user interface controller adapted to control the operation of the graphical user interface. The graphical user interface is adapted to enable the user, via a common display, to locate programs of interest in at least three distinct viewing modes corresponding to the level of the user's decisiveness regarding desirable programs to view or reproduce, all viewing modes being accessible via a common display.

BRIEF DESCRIPTION OF THE DRAWING FIGURES

Features and advantages of the present invention will become apparent to those skilled in the art from the description below, with reference to the following drawing figures, in which.

DESCRIPTION OF ILLUSTRATED EMBODIMENTS

An electronic program guide in accordance with one embodiment of the present invention iteratively narrows program choices based on a combination of user inputs and system recommendations, and thereby allows program viewers (or viewers of other types of programs) to quickly and easily access desired programming. Viewers/users can input information based upon their current preferences or their specific program desirability. System recommendations can be based upon a user's stored preference profile, and/or a service provider or other system operator's input. System operator input, in turn can be based upon any of a number of selected features, including payment by advertisers or programming providers for prominent or "premium" placement of advertising, programming and recommendations.

In the illustrated embodiment, the present-inventive EPG is operated in three major modes, although more or fewer modes can be incorporated into an actual implementation. The illustrated modes include the following:

MODE 1 ("Undecided"), where the viewer/user has little or no idea of which program to view or reproduce, and relies upon the EPG for program recommendations without any initial user input;

MODE 2 ("Partially Decided"), where the viewer/user has some idea of which program to view or reproduce, and initially inputs criteria information that EPG uses to make program recommendations; and MODE 3 ("Decided"), where the viewer/user is decided about which program to view or reproduce, and enters specific program identity information that the EPG uses to locate the programs desired.

Figure 1:
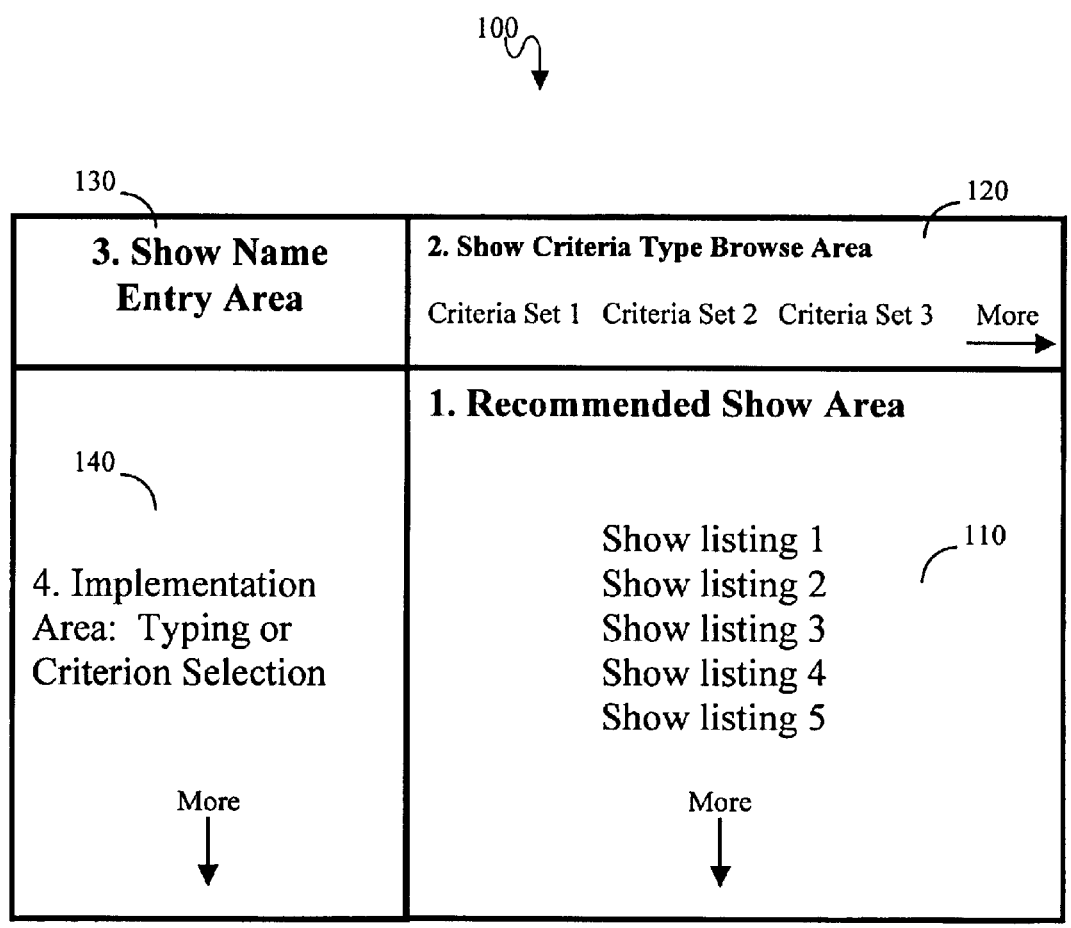
FIG. 1 is a general illustration of the display of the electronic program guide of the invention.

One embodiment of an EPG according to the invention uses a graphical user interface generally conforming to the display 100 in FIG. 1. The distinct areas serve separate functions, and are highlighted when activated according to the operation modes. A "Recommended Show" (or "Recommended Program") area 110 displays programs recommended for viewing by the EPG. A "Show Criteria" (or "Program Criteria") area 120 displays both potential program criteria information, as well as program criteria information that has been selected to locate desirable programs. A "Show Name Entry" (or "Program Identity Entry") area 130 allows a user to enter specific program information used by the EPG to locate identified programs. An auxiliary entry and display area 140 is used when areas 120 or 130 are highlighted to allow a user to type information or more easily enter alphanumeric characters (For example, see FIG. 4, where instead of entering information via a conventional keyboard, alphanumeric characters are highlighted by a cursor or other highlighter, and then entered by activating an entry key. This allows the EPG to function using only a remote control device rather than needing a computer or typewriter type keyboard).

Figure 2:
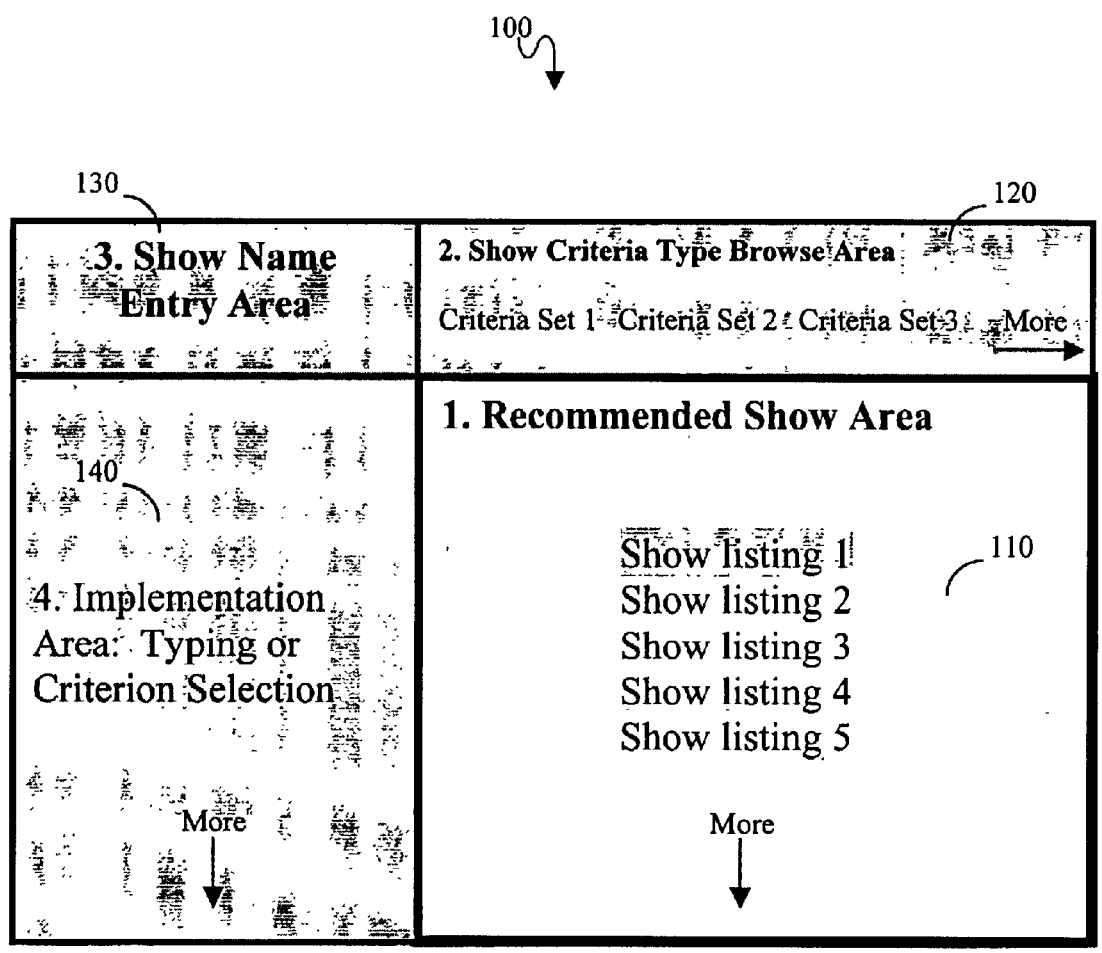
FIG. 2 is a general illustration of the display in FIG. 1 applicable to a first mode of operation.

FIG. 2 illustrates a graphical user interface (GUI) display, as it would appear during MODE 1 operation. The user who is undecided can simply scroll through a list of recommended programs and tune in to a selected program by activating a link to the channel currently showing the program of interest. The user preference profile is a matter of design choice, and may include demographic information, as well specific interests or non-interests. The recommended shows are ranked from the most recommended program to the least recommended (albeit recommended nonetheless).

As an example, the recommended program list for a mid-twenties male with interests in sports, reality television, action-dramas, and comedies might be:

1. Sopranos
2. Real World
3. Monday Night Football
4. American Pie
5. Law & Order As previously mentioned, the program recommendations can also be made by a service provider (i.e., cable television provider, satellite television provider, etc.). For example, a cable service operator can, by agreement with content providers, and for a fee, feature certain programs in the Recommended Program area.

Figure 3:
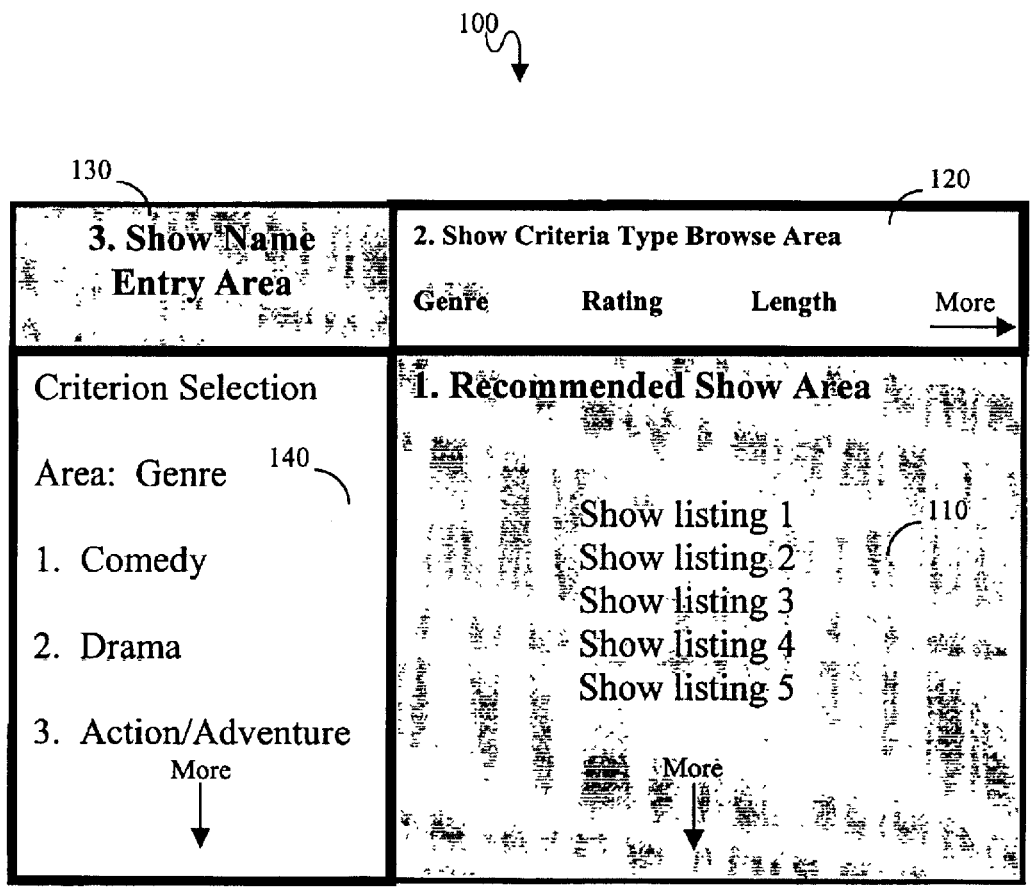
FIG. 3 is a general illustration of the display in FIG. 1 applicable to a second mode of operation.

FIG. 3 illustrates a GUI display, as it would appear during MODE 2 operation. The user who is partially decided about what types of programs he or she would like to view can highlight or enter program criteria information in area 120 with the aid of area 140. Numerous criteria can be used, such as the program genre, the program rating (e.g., MPAA rating), and the program length. The display area 140 can also show a sub-menu to further define the general criterion selected (e.g., the genre can be represented by categories such as comedy, drama, and action/adventure). Upon the user entering the program criteria, the EPG displays recommended programs in area 110 for selection and viewing.

Figure 4:
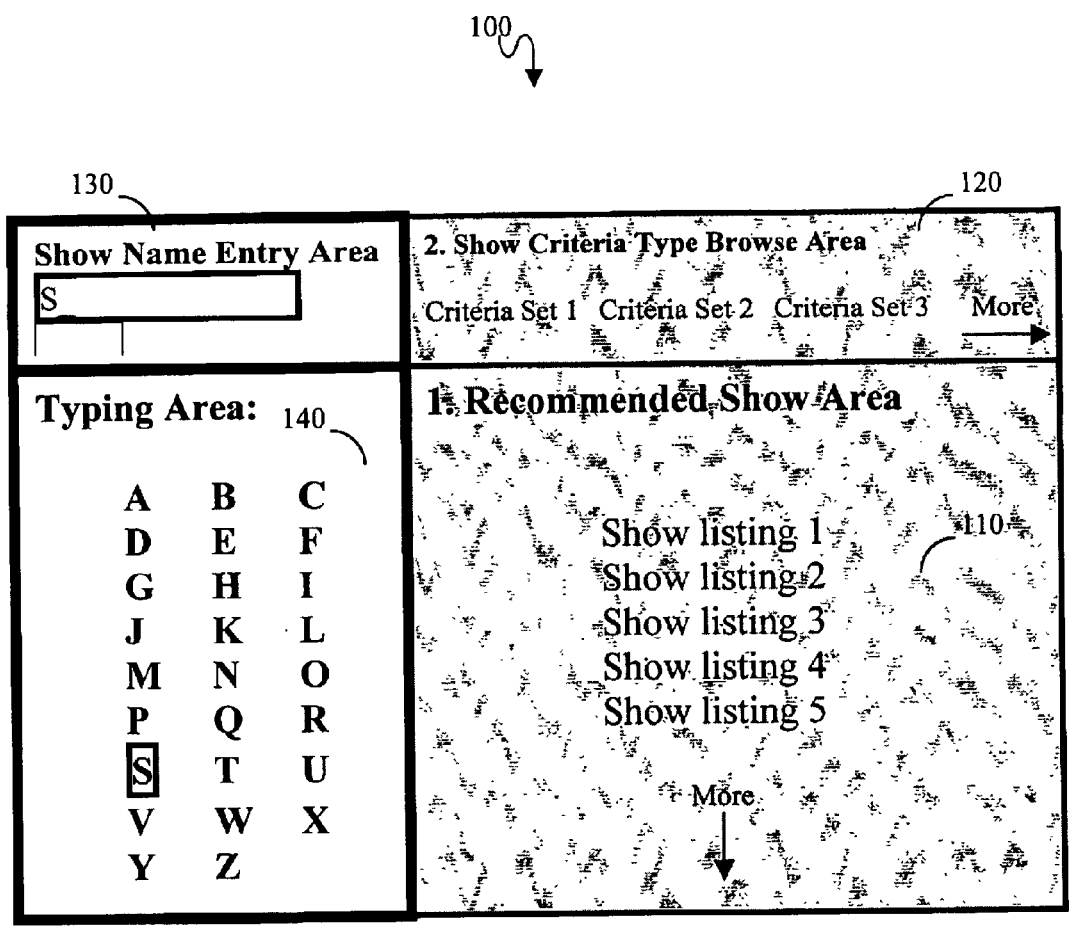
FIG. 4 is a general illustration of the display in FIG. 1 applicable to a third mode of operation.

Using the example user identified in connection with FIG. 2, the same user in MODE 2 might decide to narrow his program interests to comedies, in which case, the list of recommend programs in area 110 might read:

1. American Pie
2. Sex in the City
3. Drew Carey Show
4. Tom Green Show
5. The Big Lebowski FIG. 4 illustrates a GUI display, as it would appear during MODE 3 operation. The user who is decided about what types of programs he or she would like to view could enter program identity information via areas 130 and 140. The user can simply type the program name if a keyboard is among the system hardware. Otherwise, the alphanumeric characters can be entered via the remote control device or other device by highlighting and activation. The identified program or programs will appear in the Recommended Area 110. Rather than requiring full program names, the EPG might simply list recommended programs that have names whose initial characters match the characters entered by the user. For example, if a user with the same profile as the one discussed with regard to FIGS. 2 and 3 simply enters the letter "S," the recommended programs might be as follows:

1. Sopranos
2. Sex in the City
3. Survivor
4. South Park
5. Simpsons

However, if the same user enters "SO," the recommended programs might then appear as follows:

1. Sopranos
2. SouthPark

It should be noted that absent the present inventive EPG and method, a conventional program guide might simply list the following programs in alphabetical order when only the letter "S" is entered, which is often of only limited use:

1. Sabrina, the Teenage Witch
2. Sagwa, the Chinese Cat
3. Sally Jessie Raphael
4. Sap, the Lifeblood of Trees
5. Sealab Those skilled in the art to which the present invention pertains will appreciate that a viewer/user can use all of the previously described operation modes during the same viewing session for more efficient program navigation.

The generation of a Recommended Programs list can be carried out in a variety of ways, including matching program description and program length information with the viewer's viewing history and stored viewing preferences. In addition, the generation of a Recommended Programs list can include inputs based on payments or other consideration received from advertisers or programming content providers for enhanced placement in a recommendation list or EPG display of advertisements or television programs. In addition, advertisers and program content providers can pay for enhanced presentation in response to searches conducted using the system. For example, a beverage company could pay for enhanced presentation of advertisements or sponsored programming in response to searches conducted for "Sports" programming. In addition, advertisers and program content providers could pay for the establishment of a user-imperceptible "bias" or preference' toward affiliated advertising or programming, such that users are undetectably "steered" toward such advertising or programming. This imperceptible bias or preference could be superimposed upon the other selection and recommendation criteria described elsewhere in this document. Accordingly, the system supports both imperceptible, system-established preferences and sponsored recommendations.

Variations and modifications of the present invention are possible, given the above description. However, all variations and modifications which are obvious to those skilled in the art to which the present invention pertains are considered to be within the scope of the protection granted by this Letters Patent.

What is claimed is:

1. Via a graphical user interface, a method for allowing a user to navigate through and select programming of interest, the method comprising:

providing multiple programs for viewing or reproduction;

generating an interactive graphical user interface;

displaying via a common display, selected programs and a program guide when desired;

in response to user input, locating programs of interest in a plurality of distinct viewing modes corresponding to respective levels of a user's decisiveness regarding programs to view or reproduce, the viewing modes being accessible via the common display.

2. The method in claim 1, wherein for a first mode of operation, the method further comprises:

providing a recommended programs area on said display;

providing at least one recommended program in said recommended programs area from which a user can select for viewing or reproduction.

3. The method in claim 2, further comprising:

compiling a user profile comprising previous programs viewed or reproduced by a user;

wherein the recommended programs are determined in response to said user profile.

4. The method in claim 2, wherein the recommended programs are determined by a service provider having control over the step of providing multiple programs.

5. The method in claim 2, wherein said recommended programs are presented in a ranked order or recommendation.

6. The method in claim 1, wherein for a second mode of operation, the method further comprises:

providing a program criterion area on the display;

via the program criterion area, receiving program criterion information from a user;

providing a recommended programs area on the display;

in response to the program criterion information, providing at least one recommended program in the recommended programs area from which a user can select for viewing or reproduction.

7. The method in claim 6, wherein the program criterion information includes program genres.

8. The method in claim 6, wherein the program criterion information includes program ratings.

9. The method in claim 6, wherein the program criterion information includes program lengths.

10. The method in claim 1, wherein for a third mode of operation, the method further comprises:

providing a program entry area on the display;

via the program entry area, receiving program identity information from a user;

in response to the program identity information, providing links to identified programs from which a user can select for viewing or reproduction.

11. A graphical user interface for allowing a user to navigate through and select programming of interest, the graphical user interface comprising:

a multiple program source adapted to provide multiple programs for viewing or reproduction;

a graphical user interface display generator adapted to generate a display;

a graphical user interface controller adapted to control the operation of said graphical user interface;

wherein the graphical user interface is adapted to enable the user, via a common display, to locate programs of interest in a plurality of distinct viewing modes corresponding to a level of the user's decisiveness regarding desirable programs to view or reproduce, all viewing modes being accessible via a common display.

12. The graphical user interface in claim 11, wherein for a first mode of operation, the display comprises a recommended programs area, and at least one recommended program is displayed in the recommended programs area from which a user can select for viewing or reproduction.

13. The graphical user interface in claim 12, further comprising:

a user profile compiler adapted to compile a user profile comprising previous programs viewed or reproduced by a user;

wherein the recommended programs are determined in response to the user profile.

14. The graphical user interface in claim 12, wherein the recommended programs are determined by a service provider having control over the multiple program source.

15. The graphical user interface in claim 12, wherein the recommended programs are presented in a ranked order or recommendation.

16. The graphical user interface in claim 11, wherein for a second mode of operation, the display comprises a program criterion area, program criterion information is received via the program criterion area from a user, and in response to the program criterion information, at least one recommended program is displayed in the recommended programs area from which a user can select for viewing or reproduction.

17. The graphical user interface in claim 16, wherein the program criterion information includes program genres.

18. The graphical user interface in claim 16, wherein the program criterion information includes program ratings.

19. The graphical user interface in claim 16, wherein the program criterion information includes program lengths.

20. The graphical user interface in claim 11, wherein for a third mode of operation, the display comprises a program entry area, program identity information is received via the program entry area from a user, and in response to the program identity information, at least one identified program is displayed in the recommended programs area from which a user can select for viewing or reproduction.

* * * * *